C. HICKTON.
LACE MACHINE.
APPLICATION FILED NOV. 20, 1908.
934,914.
Patented Sept. 21, 1909.
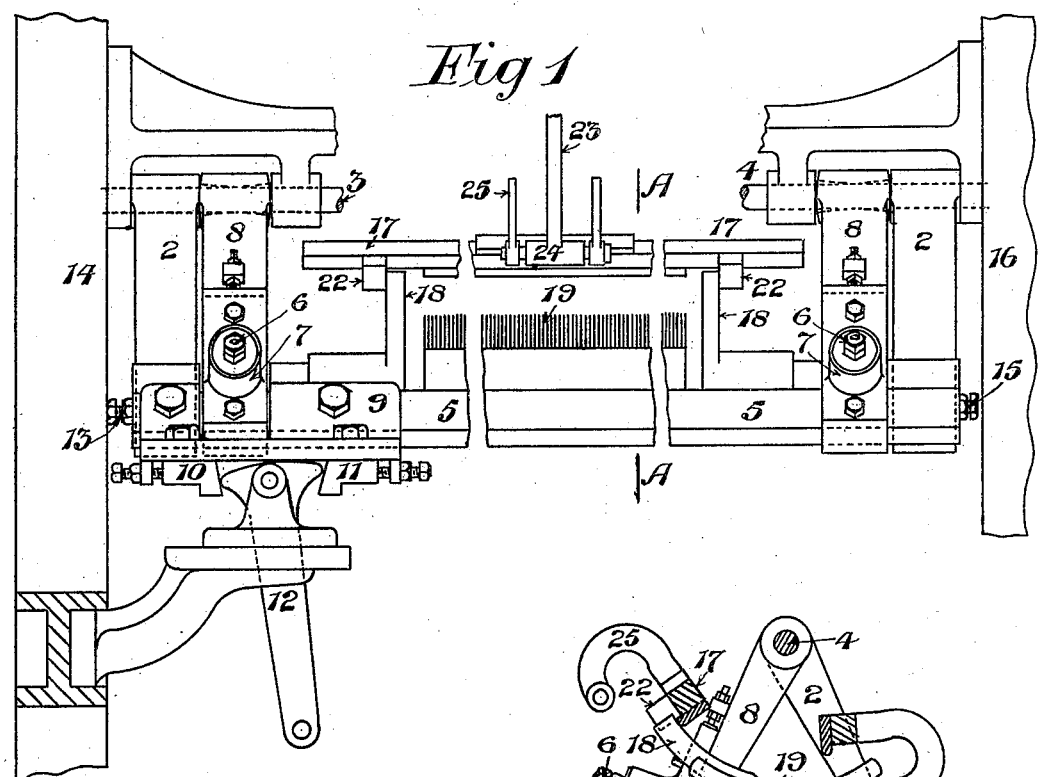
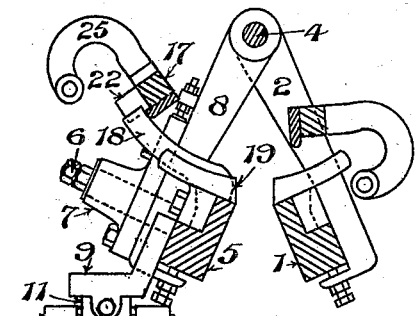
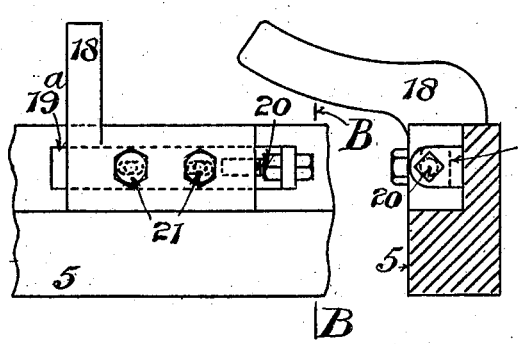
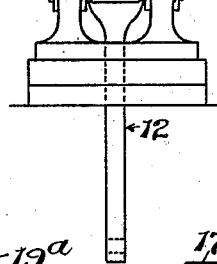
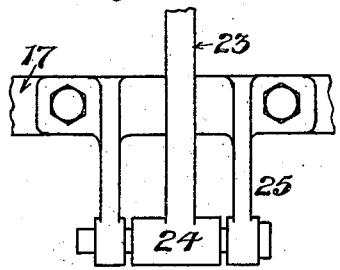
Witnesses:
L. C. Brady.
C. C. Wright
Inventor:
Charles Hickton
By J. S. Barker
Attorney

UNITED STATES PATENT OFFICE.

CHARLES HICKTON, OF LONG EATON, ENGLAND.

LACE-MACHINE.

934,914.                    Specification of Letters Patent.    Patented Sept. 21, 1909.

Application filed November 20, 1908. Serial No. 463,667.

*To all whom it may concern:*

Be it known that I, CHARLES HICKTON, a subject of the King of Great Britain, and resident of Long Eaton, in the county of Derby, England, have invented new and useful Improvements in Lace-Machines, of which the following is a specification.

This invention relates to improvements in and applicable to twist lace machines of the Levers and go-through types which are used for the manufacture of edgings, trimmings and other fancy laces, and it has particular reference to improvements in and applicable to Levers and go-through lace machines fitted with mechanism of the kind described in the specification of the British Patent No. 25542 of 1905, which mechanism is used for traversing the bobbins and carriages for the purpose of equalizing the lengths of yarn drawn off the bobbins.

In lace machines of the types herein referred to the carriages are moved from one comb bar to the other by means of catch bars and the brass plates on these catch bars become grooved, owing to the fact that they work on the comparatively sharp edges of the carriages. When a machine is fitted with means for traversing the carriages such carriages have to be traversed when they are engaged with the catch bars and consequently the edges of the carriages have to be forced out of the grooves in the catch bar plates before they can be traversed, and this action is liable to bend and strain the carriages.

This invention has for its object the combination with the means used for giving an end movement to the comb bar of means whereby the catch bar is moved endwise with the comb bar and the bending and straining of the carriages is thereby avoided.

In the accompanying drawings:—Figure 1. is a part back elevation of a go-through lace machine fitted with means for moving endwise the comb bar and also showing the application of means for moving the catch bar endwise. Fig. 2. is a section on the line A. A. Fig. 1. Fig. 3. is an elevation of part of a comb bar showing the attachment of the bracket used for moving the catch bar endwise, and Fig. 4. is a section on the line B. B. Fig. 3. Fig. 5 is an enlarged detail of parts shown in Fig. 1.

In the machine shown in the drawings the front comb bar 1 is carried by arms 2 from fixed axles 3 and 4, and it is vertically and horizontally adjustable in the usual manner. The back comb bar 5, which is preferably the one fitted to move endwise is provided with fixed axles 6 which have bearings in brackets 7 suitably mounted on the back comb bar arms 8, which arms are carried from the axles 3 and 4 in such a manner that they can swing and rock on such axles. Attached to the end of the comb bar 5 there is a fixed bracket 9 to the underside of which there is attached, with means of adjustment, two inclined nose pieces 10 and 11. Working in conjunction with the nose pieces 10 and 11 there is a tee ended lever 12 which in the position shown in Fig. 1 holds the comb bar 5 with its adjusting screw 13 in contact with the end standard 14. When the lever 12 is moved to its opposite position the comb bar adjusting screw 15 is moved into contact with the standard 16 and the amount of this movement is generally equal to one gait or the distance between the centers of two adjacent bobbins and carriages. For operating the lever 12 it is conveniently connected to an operating handle at the front of the machine.

For the purpose of moving the catch bar 17 endwise with the comb bar 5, the comb bar is fitted with adjustable brackets 18 the upper portions of which are concentric with the curve of the combs 19. The feet of the brackets 18 are grooved to fit keys 19ᵃ which are fixed to or held from end movement relatively to the comb bar, and the ends of the keys form bearings for adjusting screws 20 which engage with the feet of the brackets, and these brackets are fixed in position on the comb bar by the screws 21. Working in conjunction with the curved portions of the brackets 18 there are blocks 22 which are attached to the catch bar 17 and arranged to work on the outer faces of the brackets 18 so that the catch bar is held from end movement relatively to the comb bar and is compelled to move endwise with the comb bar. The catch bars are actuated by cams and cam levers through links 23, the bosses 24 of which are shorter than the distance between the inner faces of the catch bar bracket 25 so that the catch bar can be moved endwise without straining the links 23.

In a machine fitted with the mechanism herein described and when it is desired to traverse the carriages in one direction the said carriages are drawn into the back comb bar 5 by the back catch bar 17 and the machine is brought to rest. The lever 12 is then operated to move the comb bar endwise and this bar through one of the brackets 18 and one of the blocks 22 simultaneously moves the catch bar endwise also, so that there is no rubbing of the carriages over the face of the catch bar. The carriages are then moved into the front combs and the back comb bar is returned to its normal position. When the carriages are to be traversed in the opposite direction the first movement of the back comb bar is made when the carriages are in the front combs, and after the carriages have been moved into the back combs the back comb bar is returned to its normal position, the catch bar being moved endwise with every end movement of the comb bar.

What I claim is:—

1. In Levers and go-through lace machines the combination of means for moving the comb bar endwise with means for simultaneously and similarly moving the catch bar as herein set forth.

2. In Levers and go-through lace machines, the combination of a comb bar, a catch bar, each of these bars being longitudinally movable, interengaging means between the bars arranged to cause the catch bar to move longitudinally whenever the comb bar is moved, and means for imparting endwise or longitudinal movements to the comb bar.

3. In Levers and go-through lace machines the combination of the comb bar with means for moving it endwise, brackets carried by the comb bars, means for adjusting the position of the said brackets on the comb bar, the catch bar and blocks attached thereto and arranged to be engaged by the said brackets whereby both the said bars are caused to be simultaneously and similarly moved endwise as herein set forth.

4. In Levers and go-through lace machines the combination of the comb bar with means for moving it endwise, brackets carried by the comb bars, means for adjusting the position of the said brackets, the catch bar, blocks attached to the catch bar, catch bar brackets and links with short bosses working in conjunction therewith as herein set forth.

5. In Levers and go-through lace machines the combination of the comb bar with arms carrying the same and fitted to rock on their carrying axles, jointed connections between the comb bar and the comb bar arms, means for moving the comb bars endwise, and means whereby the catch bar is moved endwise from and by the comb bar as herein set forth.

CHARLES HICKTON.

Witnesses:
WILLIAM H. POTTER,
HARRY ROPER.